United States Patent [19]

Terrell et al.

[11] Patent Number: 4,764,066
[45] Date of Patent: Aug. 16, 1988

[54] LIGHT GAUGE SELF-TAPPING SHEET METAL SCREW

[75] Inventors: Ollney B. Terrell, Jamestown; Larry J. Arnold, Statesville, both of N.C.

[73] Assignee: Farley Metals, Inc., Chicago, Ill.

[21] Appl. No.: 725,656

[22] Filed: Apr. 22, 1985

[51] Int. Cl.⁴ .......................................... F16B 39/282
[52] U.S. Cl. ..................................... 411/187; 411/399
[58] Field of Search ................. 411/180, 181, 184–188, 411/399, 386, 410, 134; 403/408.1

[56] References Cited

U.S. PATENT DOCUMENTS

| | | |
|---|---|---|
| 213,551 | 3/1859 | Doten . |
| 240,387 | 4/1861 | Cowdy . |
| 388,000 | 8/1888 | Rider . |
| 430,236 | 6/1890 | Rogers . |
| 465,101 | 12/1891 | Richards . |
| 1,114,135 | 10/1914 | Hafertep . |
| 1,151,861 | 8/1915 | Brumback . |
| 1,175,665 | 3/1916 | Sweet . |
| 1,411,184 | 3/1922 | Rosenberg . |
| 1,680,015 | 8/1928 | Davis . |
| 1,855,447 | 4/1932 | Hagstedt . |
| 1,887,616 | 11/1932 | Berge . |
| 2,016,610 | 10/1935 | Moeller . |
| 2,217,951 | 10/1940 | Hosking . |
| 2,229,892 | 1/1941 | Hosking . |
| 2,342,170 | 2/1944 | Tinnerman . |
| 2,391,308 | 12/1945 | Hanneman ............................ 411/134 |
| 2,562,032 | 7/1951 | Gutensohn . |
| 2,982,166 | 5/1961 | Hobbs . |
| 3,073,207 | 1/1963 | Lovisek . |
| 3,255,797 | 6/1966 | Attwood . |
| 3,434,521 | 3/1969 | Flora . |
| 3,640,326 | 2/1972 | Brown . |
| 3,750,525 | 8/1973 | Waters et al. ....................... 411/181 |
| 3,903,784 | 9/1975 | Dekker . |
| 4,293,256 | 10/1981 | Pamer ..................................... 411/11 |
| 4,294,300 | 10/1981 | Bouwman ............................ 411/185 |
| 4,310,272 | 1/1982 | Rich et al. ............................ 411/185 |
| 4,516,893 | 5/1985 | Barth .................................... 411/399 |
| 4,518,294 | 5/1985 | Barth .................................... 411/399 |

FOREIGN PATENT DOCUMENTS 640046  7/1950  United Kingdom ................ 411/410

*Primary Examiner*—Neill Wilson
*Attorney, Agent, or Firm*—Hugh Adam Kirk

[57] ABSTRACT

This disclosure concerns a light gauge self-tapping sheet metal screw having a threaded shank and cap-type head, which head has a tool-engaging surface. Between the cupped recess of the head and the shank are a plurality of pyramidal ribs that extend partway around the shank for deforming the edge of the holes in the sheet metal up against the recessed surface of the cup of the head to increase the stripping and backout torque of the screw.

11 Claims, 1 Drawing Sheet

U.S. Patent   Aug. 16, 1988   4,764,066
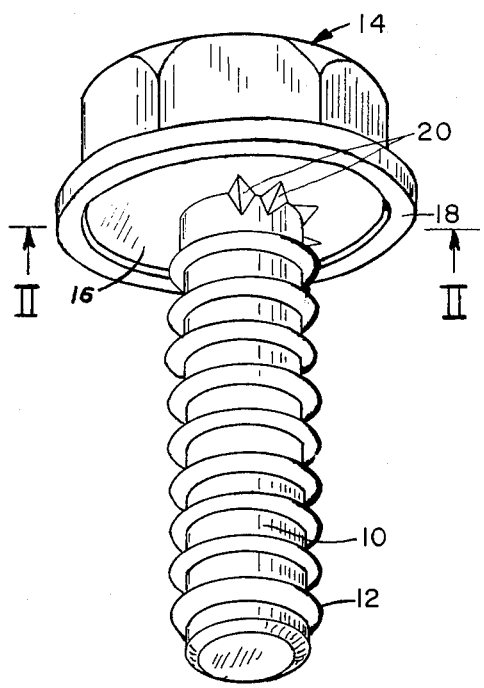
Fig I
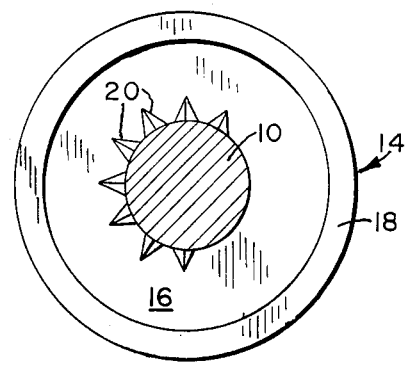
Fig II
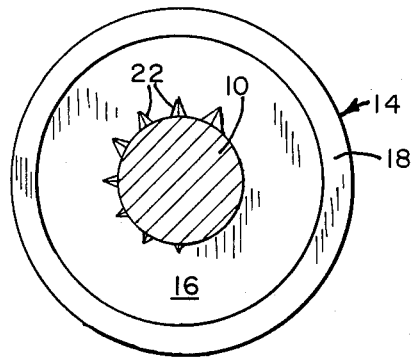
Fig III
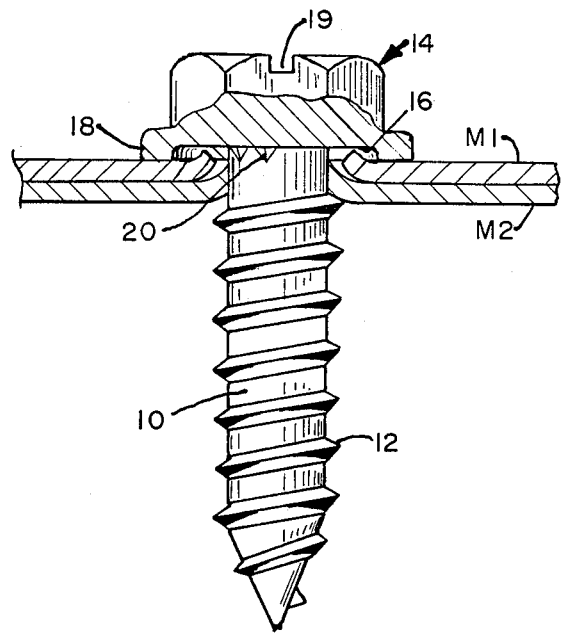
Fig IV

LIGHT GAUGE SELF-TAPPING SHEET METAL SCREW

BACKGROUND OF THE INVENTION

Many varieties of self-tapping sheet metal screws having ribs, grooves or teeth around their shanks and heads to increase the resistance of the screws to removal once they are engaged for fastening metal sheets, are well known and are shown in the prior art. However, there is no known reference disclosing or teaching an unsymmetrical or incomplete circumferential series of ribs around a shank adjacent the cupped-shape head of the screw as discovered by applicants.

SUMMARY OF THE INVENTION

Generally speaking, the screw of this invention comprises a cylindrical shank, one end of which may be tapered or conical in form, and the other end of which has a head, the outer side and/or end of which is provided with means for engagement with a tool for rotating the screw about its axis. The shank of the screw is provided with a self-cutting helical thread from its outer end up to adjacent the underside of the head. The outer circumference of the head adjacent its attachment to the shank is provided with a flange extending cylindrically outwardly parallel and coaxial with the axis of the shank to provide a cap or cup-shaped head having a recessed annular surface radially from the shank.

The novel feature of this invention is the provision of a plurality of successive pyramidal tetrahedron-shaped ribs around and bridging the junction between the recessed surface of the head and the adjacent end of the shank, but only partway circumferentially around the shank. These ribs preferably extend at least more than about halfway around and less than about three-quarters of the way around the shank, specifically between about 200° and 270° and preferably about 216° or 60% of the circumference of the shank. Each of these ribs individually are shaped similar to a regular equal four-sided tetrahedron which extends approximately about half the radial distance between the shank and the flange across the recessed surface of the head. There are about seven of these ribs on each screw; however, this number may vary without departing from the scope of the invention. Although the ribs shown are all of equal size and shape, it is to be understood that they may gradually increase in height radially from the shank from the first rib adjacent the upper end of the helical screw. Thus, as the screw is turned or rotated, not only will the ribs be gradually forced further toward the edges of the holes in the metal sheets that are to be fastened together, but also further increase the amount of crimping of the metal in the edges of said holes.

Thus in fastening the screws of this invention, the recessed portions of their heads permit the edges of the holes in the two metal sheets to be deformed upwardly into said recesses and their tetrahedral ribs aid in this deforming process. However, unexpectedly it has been discovered that having only a partial circumference of the shank provided with these ribs, an increased backout resistance of the screw from the metal sheets is obtained.

OBJECTS AND ADVANTAGES

Accordingly, it is an object of this invention to produce an efficient, effective, economic, simple light gauge self-tapping sheet metal screw which has an increased stripping torque and backout torque over prior known self-tapping sheet metal screws.

Another object is to produce such a screw which reduces the material fatigue, reaming effect, and scrap due to its inability to overstrip a tapped hole.

Other objects are to produce such a screw with an increased vibration resistance to loosening, to increase the crimping of the edge of the hole, and to increase the screw's ability to be reinstalled into its pre-made hole and still maintain its original backout resistance.

BRIEF DESCRIPTION OF THE VIEWS

The above mentioned and other features, objects and advantages, and the manners of attaining them are described more specifically below by reference to embodiments of this invention shown in the accompanying drawings wherein:

FIG. I is an enlarged perspective view of one embodiment of this invention showing the recess under its head and the incomplete circumferential series of ribs;

FIG. II is a sectional view taken along line II—II of FIG. I showing the head edge flange and the crimping ribs partly around the shank under the head of the screw;

FIG. III is a view similar to FIG. II showing another embodiment of this invention having variable height ribs;

FIG. IV is a side elevational view of a screw according to this invention with parts thereof broken away, showing how the screw deforms the pair of light gauge sheets of metal to crimp them upwardly toward the recessed surface under the head of the screw and into engagement with the ribs of this invention.

DETAILED DESCRIPTION OF PREFERRED EMBODIMENTS

Although different specific screws are shown in each of the FIGS. I, III and IV, all of these screws have a shank or body portion 10, the cylindrical outer surface of which is provided with a self-threading, cutting or tapping helical thread 12, which in the case of a conically pointed screw as shown in FIG. IV extends over the conical end thereof. This thread 12 extends toward the head 14 to just short of its recessed surface 16. This recess is formed by the peripheral flange 18 which is shown herein to extend outwardly from the hexagonal outer surface of the outer end of the head, as well as longitudinally coaxially with the axis of the shank along the shank. The head of this screw may be slotted so as to fit an ordinary screwdriver, such as the slot 19 shown in FIG. IV.

An important feature of this invention is the ribs 20 or 22 shown in FIGS. II or III, respectively, which comprise pyramidal-shaped projections abridging the angular junction between the upper end of the shank 10 and the recessed surface 16. These ribs 20 or 22 only extend partway around the circumference of the shank, as more clearly shown in FIGS. II and III, and may be either of the same radial height as the ribs 20 shown in FIG. II or of gradually increasing height as shown for the ribs 22 in FIG. III. Each of these ribs have sloping sides and at their junction between the shank 10 and surface 16 are adjacent to each other. They extend up to about almost half the radial diameter of the surface 16 between the shank and flange 18, although they can be greater or lesser than this amount without departing from the scope of this invention. In each of the embodiments shown in FIGS. II and III, the ribs 20 and 22 usually extend the same distance axially along the shank 10 from the recessed surface 16, regardless of their difference in height as shown in FIG. III. However, this axial distance along the shank 10 also may be gradually varied, if desired, without departing from the scope of this invention.

Referring now specifically to FIG. IV, the two sheets of light gauge metal M1 and M2 are usually pre-drilled or punched with the aperture or hole in the lower or inner sheet M2 being substantially identical to the root diameter of the screw to be used, while the aperture in the upper sheet M1 is usually slightly larger and corresponds substantially to the major diameter of the threads of that screw. Thus when the screw is inserted in these apertures and tightened, there is a space under the head into which the edges of these holes in sheets M1 and M2 may be crimped upwardly toward the recessed portion 16 of the head 14 of the screw. The serrations or ribs 20, or 22, thus engage the upwardly crimped edge of the holes in sheet M2 to roughen its edge to increase the resistance to removal or unscrewing of the screw, and by having the ribs 20 or 22 only extend partway around the circumference of the shank 10, there is avoided reaming of this edge to further increase its resistance to removal and/or loosening once it is installed as shown in FIG. IV. Furthermore, since the hole in the top sheet is reamed by the ribs 20 or 22, it also enables the screw to be removed and replaced, if necessary, without reducing its backout resistance.

Although there are shown some specific embodiments of the light gauge self-tapping sheet metal screw of this invention, it is to be clearly understood that other shaped heads for different types of tools can be employed without departing from the scope of this invention. Thus, the head of the screw may have an outer surface that is semispherical or polygonal, as desired. However, the underside of the head should be recessed so that the head is of a cup or cap shape to provide such a recessed surface 16 into which the crimped edge of the holes in the light gauge metal sheets M1 and M2 may be deformed or crimped. In ordinary self-threading prior art sheet metal screws the edges of the holes are deformed oppositely, i.e. away from the head toward the outer end of the screw. Furthermore, it should be understood that other shaped threads may be employed, and/or other shaped shanks, without departing from the scope of this invention. The peripheral flange 18 shown in the embodiments of this description also may be extended inwardly or outwardly radially from the shank from its location shown in the drawings without departing from the scope of this invention.

While there is described above the principles of this invention in connection with specific apparatus, it is to be clearly understood that this description is made only by way of example and not as a limitation to the scope of this invention.

We claim:

1. A screw for fastening two adjacent light gauge metal sheets together through aligned apertures in said sheets comprising:
    (A) a cylindrical shank with self-cutting helical threads therealong, and
    (B) a head with an annular peripheral flange extending concentric to the axis of said shank to form a recessed portion under said head, whereby said threads crimp said sheets into said recessed portion,
the improvement comprising:
    (C) a plurality of identical tetrahedral reaming ribs extending only partly around said shank and the rest of said shank is unobstructed, said ribs extending from a point along said shank away from said head angularly and radially outwardly from said shank to the recessed portion under said head for about half the diameter of said recessed portion of said head, said ribs bridging the right angle between said shank and said recessed portion of said head whereby a sharp outer edge of said ribs extends radially outwardly from said shank diagonally across said right angle to said recessed portion of said head for partly reaming the aperture in the metal sheet adjacent said head.

2. A screw according to claim 1 wherein said head has a tool-engaging configuration.

3. A screw according to claim 1 wherein said head has a hexagonal circumferential surface.

4. A screw according to claim 1 wherein said head has a diametrical slot opposite said shank.

5. A screw according to claim 1 wherein said ribs extend for more than about half and less than about three-quarters of the circumference of said shank.

6. A screw according to claim 1 wherein said ribs extend from between about 200° and about 270° around said shank.

7. A screw according to claim 6 wherein said ribs extend about 216° around said shank.

8. A screw according to claim 1 wherein said screw fastens two parallel light gauge sheets of metal with concentric adjacent holes by crimping the edges of both of said holes into said recess of said head to increase the backout torque of said screw.

9. A self-tapping screw for fastening two adjacent light gauge metal sheets together through aligned apertures in said sheets comprising:
    a threaded shank, and
    a tool-engaging head with a recessed portion adjacent said shank, whereby said threads crimp said sheets into said recessed portion,
the improvement comprising:
    a plurality of identical tetrahedral reaming ribs extending only partly around said shank and the rest of said shank is unobstructed, said ribs extending from a point along said shank away from said head angularly and radially outwardly from said shank to the recessed portion under said head for about half the diameter of said recessed portion of said head, said ribs bridging the right angle between said shank and said recessed portion of said head whereby a sharp outer edge of said ribs extends radially outwardly from said shank diagonally across said right angle to said recessed portion of said head for partly reaming the aperture in the metal sheet adjacent said head.

10. A screw according to claim 9 wherein said head has a peripheral cylindrical flange coaxial with and extending longitudinally of the shank.

11. A screw according to claim 9 wherein said ribs are tetrahedral in shape.

* * * * *